United States Patent [19]

Baker et al.

[11] Patent Number: 4,771,295

[45] Date of Patent: Sep. 13, 1988

[54] THERMAL INK JET PEN BODY CONSTRUCTION HAVING IMPROVED INK STORAGE AND FEED CAPABILITY

[75] Inventors: Jeffrey P. Baker; Duong T. La, both of San Diego; Randy A. Coverstone, Newark, all of Calif.

[73] Assignee: Hewlett-Packard Company, Palo Alto, Calif.

[21] Appl. No.: 880,774

[22] Filed: Jul. 1, 1986

[51] Int. Cl.[4] .............................. G01D 15/18
[52] U.S. Cl. .................................... 346/1.1
[58] Field of Search ............... 346/140, 1.1, 46, 75

[56] References Cited

U.S. PATENT DOCUMENTS

| | | | |
|---|---|---|---|
| 3,441,950 | 4/1969 | Miller | 346/140 A |
| 4,095,237 | 6/1978 | Amberntsson | 346/140 |
| 4,306,245 | 12/1981 | Kasugayama | 346/140 |
| 4,436,439 | 3/1984 | Koto | 346/140 X |
| 4,500,895 | 2/1985 | Buck | 346/140 |
| 4,511,906 | 4/1985 | Hara | 346/140 |
| 4,593,296 | 6/1986 | Dagna | 346/140 |
| 4,611,219 | 9/1986 | Sugitani | 346/140 |
| 4,630,076 | 12/1986 | Yoshimura | 346/140 |
| 4,677,447 | 6/1987 | Nielsen | 346/140 |

*Primary Examiner*—Joseph W. Hartary
*Attorney, Agent, or Firm*—William J. Bethurum

[57] ABSTRACT

The novel pen body construction described herein includes multiple ink storage compartments communicating with a multi-orifice printhead, and these compartments are adapted to receive sections of ink-storage foam. Preferably, this foam is a reticulated polyurethane foam of controlled porosity and capalarity and is especially well suited for storing different ink colors, such as cyan, magenta and yellow. However, single compartment black ink storage is also within the scope of this invention.

11 Claims, 2 Drawing Sheets

THERMAL INK JET PEN BODY CONSTRUCTION HAVING IMPROVED INK STORAGE AND FEED CAPABILITY

TECHNICAL FIELD

This invention relates generally to thermal ink jet pen construction and more particularly to a single or multi-compartment pen body having improved ink storage and distribution capabilities.

BACKGROUND ART

In the art of thermal ink jet printing, it is known to provide a bladder type of ink reservoir for supplying ink to a thermal ink jet printhead. The printhead will typically include a thin film resistor (TFR) substrate having a plurality of heater resistors therein, and a barrier layer and orifice plate member is usually mounted on top of the thin film resistor substrate. This member will typically include the ink reservoirs which are disposed above the heater resistors and further defines the corresponding drop generator nozzles for ejecting ink onto a print medium.

The bladder reservoir for supplying ink to the entire printhead may, for example, take the form of a rubber thimble which is located within the housing to which the thermal ink jet printhead is affixed. This type of reservoir and printhead construction is disclosed, for example, in the *Hewlett Packard Journal*, Volume 36, Number 5, May 1985, incorporated herein by reference.

Whereas these bladder type reservoirs have proven generally satisfactory for certain types of thermal ink jet (TIJ) printers, they nevertheless take up too much space and are unable to hold a sufficiently large volume of ink for other types of printer applications.

DISCLOSURE OF INVENTION

Accordingly, the general purpose of this invention is to provide new and improved pen body construction adapted for use in thermal ink jet printers. This new pen body construction represents a significant departure from the bladder-type ink storage approach and includes a novel printhead and ink storage structural arrangement. In this arrangement, the above problems associated with the ink storage and ink delivery mechanisms of the prior art have been either eliminated or substantially minimized.

To accomplish this purpose, we have discovered and developed a novel pen body construction which includes a certain ink storage foam which is preferably a controlled porosity polyurethane foam. This foam has been reticulated to break the walls of small membranes within the foam material and thereby increase the mobility of ink flow therein. The foam is also compressed to reduce the pore size therein to in turn reduce the foam thickness while increasing its density. In this manner, the desired capillarity of the foam can be controlled. By this process, the capillary force of the foam is increased and thereby renders this ink storage medium especially well suited for feeding ink to a thin film resistor type of thermal ink jet printhead. Furthermore, this ink feed apparatus is provided using a minimum of space (volume) to house the foam, and it features a corresponding maximum of ink storage capability in the foam. In addition, this polyurethane foam is economical to provide and is particularly adaptable for insertion into separate adjacent compartments of a pen body housing. This housing may then be used to store ink in various colors, such as cyan, magenta, and yellow, in a disposable pen body according to one embodiment of the invention.

The various advantages and novel features of this pen body construction will become more readily apparent in the following description of the accompanying drawing.

BEST MODE FOR CARRYING OUT THE INVENTION

Figure 1:
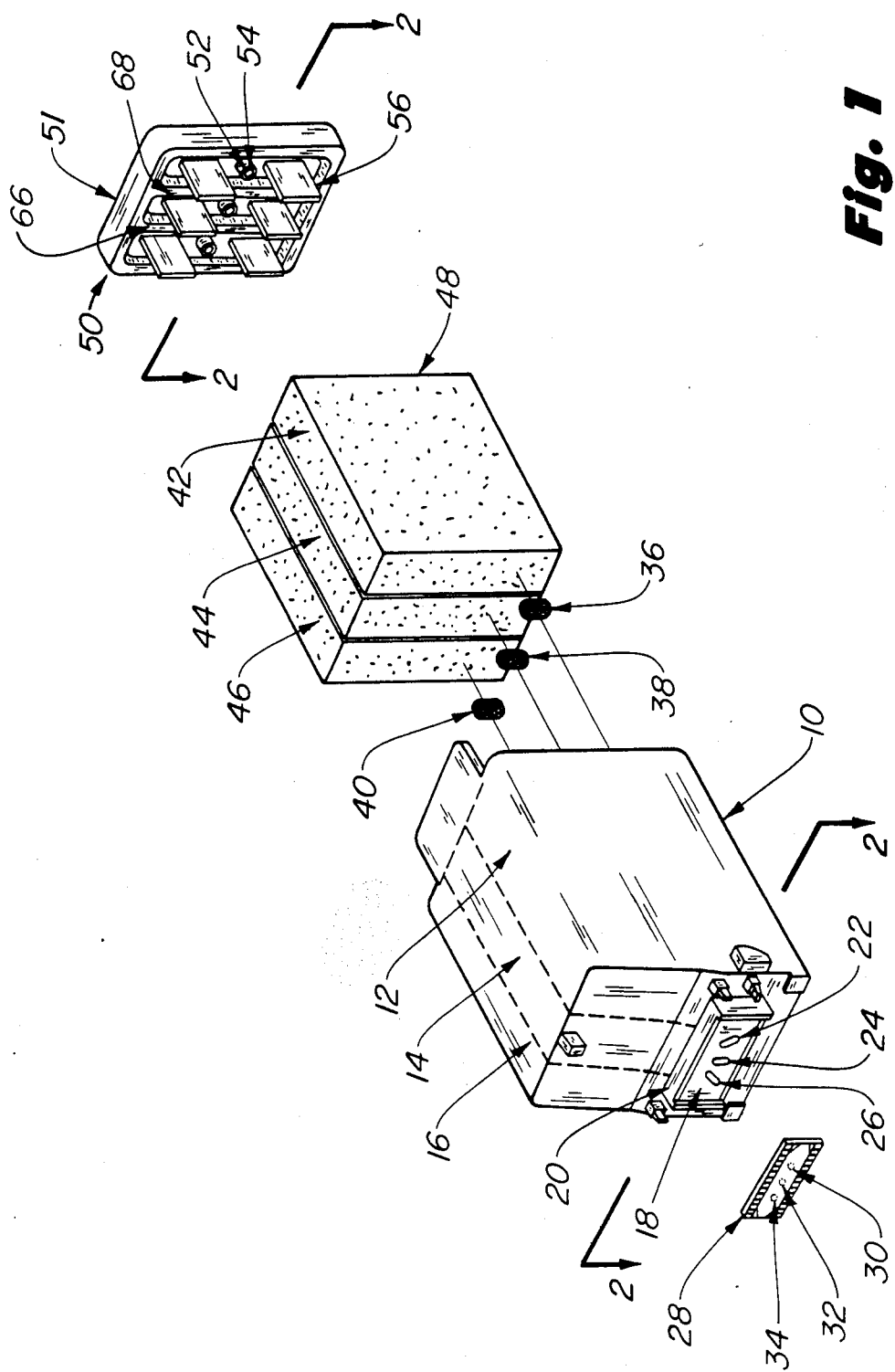
FIG. 1 is an exploded view of the pen body construction according to one embodiment of the invention.

Referring now to FIG. 1, there is shown a three compartment pen body designated generally as 10 and having three (3) ink storage compartments 12, 14 and 16 therein as indicated by the dashed line divider partitions within the interior of the body 10. The pen body 10 further includes an output printhead support surface 18 which is joined to upstanding side walls 20 in a rectangular receptacle configuration. This structure further includes three (3) ink output ports 22, 24 and 26 respectively communicating with the three ink storage compartments 12, 14 and 16.

The rectangular support receptacle 18 is configured to receive a thin film resistor type printhead 28 having a plurality of ink ejection orifice groups 30, 32 and 34 respectively which are circular in geometry and which communicate with the ink flow passages 22, 24 and 26 extending to the surface 18 of the rectangular support receptacle.

In the assembly of FIG. 1, three ink filters 36, 38 and 40 are mounted within the compartments 12, 14 and 16, respectively. These filters are typically constructed from stainless wire mesh of a desired porosity to provide good filtration of air bubbles and solid particles when passing ink from the three sections 42, 44 and 46 of polyurethane foam located in the three compartments 12, 14 and 16 of the pen body 10.

The back surface 48 of the foam body sections 42, 44 and 46 is fitted with a plug generally designated as 50, and this plug including its end cover 51 prevents backpressure build up and facilitates the removal of ink from the foam and through the filters 36, 38 and 40 to the printhead 28. Air vents 52 are covered with porous plastic membranes 54 which prevent ink from leaking out through the air vents 52. The remaining structural detail of these three vents 52 and their intermediate wall partitions 66 and 68 is shown in a larger cross-section view in FIG. 2 below. As previously indicated, the foam material of sections 42, 44 and 46 is a controlled porosity ether-type polyurethane foam which has been reticulated to break the membrane walls therein. This increases the capillary force of the foam and thereby renders it especially well suited for feeding ink along the ink feed paths to a thin film resistor thermal ink jet printhead. The plug 50 further includes foam compression tabs 56 which extend into the foam sections 42, 44 and 46 as shown and provide a desired amount of compressive forces to the foam for further increasing capillary forces in the foam and optimizing ink dispensation to the printhead.

The particular foam which has been used in actual practice is an ether-type foam material obtained from the Scott Paper Company of Philadelphia, Pa. and had a porosity of between 60 and 75 pores per inch.

Figure 2:
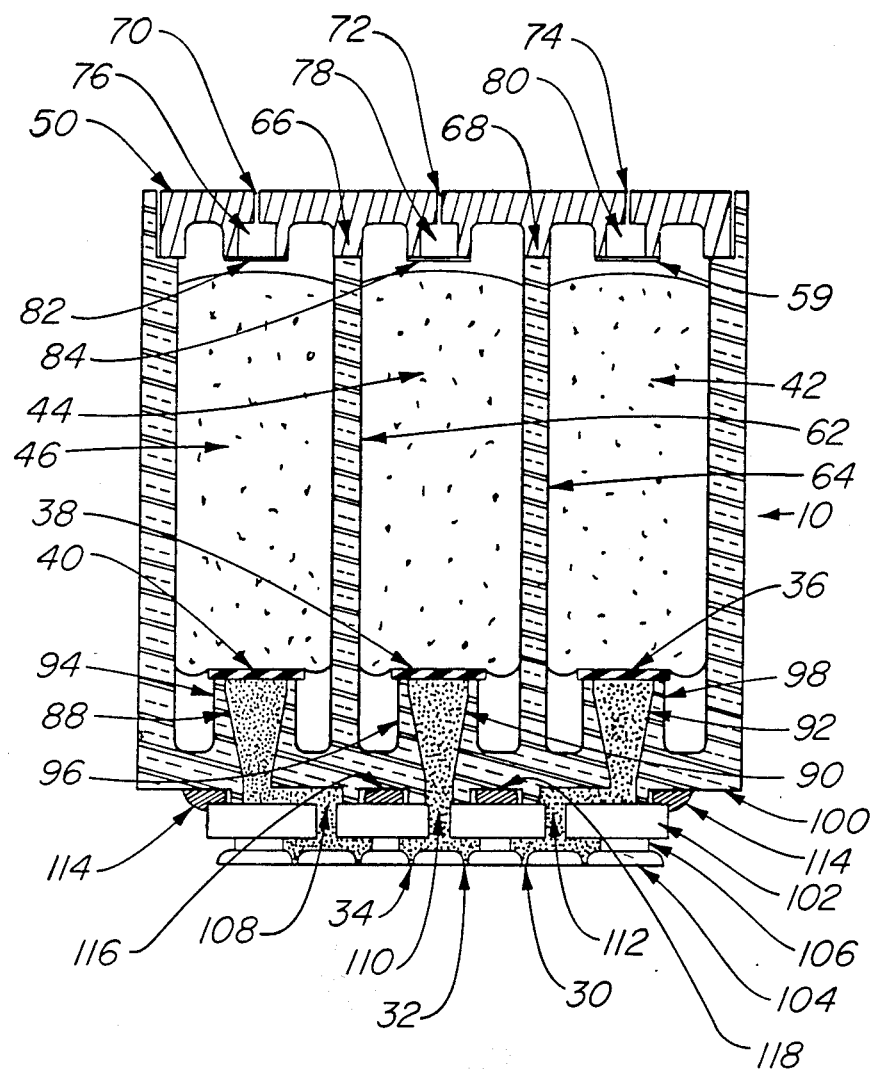
FIG. 2 is a cross section view taken along lines 2—2 of FIG. 1.

Referring now to FIG. 2, the cross section view in this figure is taken along lines 2—2 of FIG. 1 wherein like reference numerals have been used in both figures to identify the same components therein. The pen body 10 includes interior walls 62 and 64 which serve to partially define the three compartments for receiving the rectangular sections 42, 44 and 46 of foam as shown in FIG. 1. These interior walls 62 and 64 receive the corresponding T-shaped interior extensions 66 and 68 of the cover or end member 51 of the previously described end plug 50. This plug 50 further includes air vents 70, 72 and 74 which communicate with the cavities or recessed portions 76, 78 and 80 as shown. These recessed portions or cavities 76, 78 and 80 in the cover member 51 of the plug 50 receive a plurality of porous membranes 82, 84 and 54 which are fabricated from polytetraflouroethylene (PTFE) and which provide adequate ventilation within the three compartments of foam. At the same time, these membranes 82, 82 and 54 are of sufficient mesh density to prevent ink back-flow through the three air vents 70, 72 and 74.

A plurality of ink chambers 88, 90 and 92 are provided as shown in the three ink pipes 94, 96 and 98, respectively, in the lower regions of the pen body 10. Each of these ink pipes 94, 96 and 98 are provided, respectively, with the three previously identified wire mesh filters 40, 38 and 36. These latter filters provide filtering of air bubbles and solid particles from the ink which ultimately passes through the ink pipes 88, 90 and 92 and to the TFR printhead 28. This ink flow path also includes the lateral ink passage located between the lower surface 100 of the pen body 10 and the facing surface of the semiconductor substrate member 102 of the TFR printhead substrate 28.

The geometrical configuration of the ink pipes 94, 96 and 98 in combination with the walls 62, 64 and 66 and the spacing therebetween beneath the foam increases the compression of the foam in the areas above the three filters. This fact in turn increases the capillarity of the foam in the region thereof above these three filters and thus reduces the possibility of air bubbles interrupting the ink path vertically down through the foam and into the three ink pipes 94, 96 and 98.

The substrate member 102 is bonded to a nozzle plate 104 by means of an adhesive barrier 106. This barrier 106 may advantageously be a selected polymer material such as the RISTON or VACREL trade name polymer materials made available by the E. I. Dupont Company of Wilmington, Del. The ink will flow vertically down through the ink pipes 88, 90 and 92 and then into the three vertical passages 108, 110 and 112 in the substrate member 102. These vertical passageways 108, 110 and 112 will then feed ink to the plurality of groups of orifices 30, 32 and 34 in the nozzle plate 104 and located in a circular pattern as shown.

The nozzle plate 104 may advantageously be electroformed of nickel and plated with gold and then affixed to the polymer barrier material 106 using, for example, the heat staking process disclosed and claimed in copending application Ser. No. 861,192 of Stephen J. Nigro et al. This application is entitled "Process For Manufacturing Thermal Ink Jet Printheads and Structures Produced Thereby", and is assigned to the present assignee and incorporated herein by reference. The nozzle plate 104 may be fabricated in the manner described in the above identified *Hewlett Packard Journal,* Vol. 38, No. 5 May 1985.

Finally, the thin film resistor structure 28 is secured to the bottom facing surface 100 of the pen body 10 by means of a suitable adhesive 114 which is disposed as shown at the outer periphery of the substrate 102, as well as at interior recessed wall surfaces 116 and 118 thereof.

The present invention is not limited to thermal ink jet applications and may instead be used in other types of ink jet applications in which the above foam storage-of-ink capability is desirable and compatible.

INDUSTRIAL APPLICABILITY

The pen body according to this invention is useful in the manufacture of black and white and color printers and plotters operative in a variety of raster and vector modes.

We claim:

1. A process for feeding ink to an ink jet printhead which comprises the steps of:
   a. storing ink in a reticulated polyurethane foam of controlled capillary force,
   b. bringing said foam into ink flow communication with said printhead, and
   c. passing ink from said foam and through ink ejection orifices in said printhead, whereby ink is communicated from said foam to said printhead with a controlled capillary force.

2. The process defined in claim 1 which includes:
   a. providing said foam in three separate sections, and
   b. providing these sections with the ink colors of cyan, magenta and yellow, respectively, whereby a relatively low cost 3-color pen is provided with a high volume and high density ink storage capability.

3. The process defined in claim 1 wherein said foam is inserted into a single compartment pen body and filled with black ink.

4. An ink jet pen including, in combination,
   a. a housing and support member having a support surface at one end thereof with openings for passing ink therethrough,
   b. an ink jet printhead mounted on said support surface and having a plurality of ink ejection orifices communicating with said openings in said support surface, and
   c. a reticulated polyurethane foam material mounted within said housing and said support member and operative to receive and retain a supply of ink for feeding said ink through said openings in said support surface and to said inkjet printhead, with said printhead receiving ink directly from said openings in said support surface and operative to eject ink in a direction normal to said support surface.

5. The pen defined in claim 4 wherein said housing has three separate compartments therein for receiving three bodies of foam which function respectively to store three colors of ink such as cyan, magenta and yellow in a three color pen, and wherein each compartment includes an ink pipe for feeding ink from said foam to said printhead, said ink pipe being located between vertical walls defining each compartment and spaced therefrom so as to increase the compressive forces on said foam in the region of said foam above each said ink pipe, whereby capillarity in said foam region is increased and thereby reduces the possibility of air interrupting the ink path vertically through said foam and into said ink pipe.

6. An ink jet pen including in combination:
  a. housing means including a support surface at one end thereof with openings for passing ink,
  b. an ink jet printhead mounted on one side of said support surface and having a plurality of ink ejection orifices for receiving ink from said openings and operative for ejecting ink of selected colors from the plane of said orifices onto a print medium, and
  c. means within said housing for storing ink of various colors and black and for feeding said ink directly through and normal to both said support surface of said housing means and an adjacent parallel surface of said ink jet printhead and through said ink ejection orifices in a direction normal to said support and printhead surfaces, said storing means includes compartments therein each containing a reticulated polyurethane foam for receiving said ink.

7. The pen defined in claim 6 wherein said feeding means includes ink pipes connecting foam in each of said compartments with said openings in said support surface.

8. Ink storage and ejection means for an ink jet pen comprising a foam material means for storing ink of selected colors and black or clear vehicle located within a housing, and an ink jet printhead mounted on an external surface of said housing for receiving ink from said foam material means and through openings in said housing and for ejecting ink in a direction normal to said surface of said housing, said foam material means being a controlled porosity ether type foam which has been reticulated to break the membrane walls therein, thereby increasing the capillary force of the foam and also increasing the mobility of ink flow therein.

9. The invention defined in claim 8 wherein said foam has a porosity of between 60 and 75 pores per inch.

10. A printhead and orifice plate assembly which comprises:
  a. a substrate member having a plurality of openings therein for receiving different colors of ink,
  b. a barrier layer mounted on said substrate and having a geometry defining a plurality of ink reservoirs which receive ink from said openings,
  c. a nozzle plate disposed on said barrier layer and having a plurality of ink ejection orifices which receive different colors of ink from said reservoirs, whereby multiple colors of ink may be ejected from a single plane in which said orifices lie,
  d. a multi-compartment housing adjacent to and supporting said substrate member, and
  e. ink storage means within each compartment of said housing for supplying ink to said substrate member and directly through openings in said housing, said ink storage means being a reticulated polyurethane foam.

11. An ink jet pen including, in combination:
  a. a housing and support member having a support surface at one end thereof for passing ink,
  b. an ink jet printhead mounted on said support surface and having a plurality of ink ejection orifices communicating with openings in said support surface,
  c. a porous ink storage material mounted within said housing and said support member and operative to receive and retain a supply of ink for feeding said ink through said opening in said support surface and to said ink jet printhead, and
  d. an ink pipe extending between said ink jet printhead and said porous ink storage material and extending into compressive contact with said ink storage material so as to increase the compressive forces thereon and thereby increase the capillarity in said ink storage material.

* * * * *

REEXAMINATION CERTIFICATE (2642nd)

United States Patent [19]

Baker et al.

[11] B1 4,771,295

[45] Certificate Issued Aug. 1, 1995

[54] THERMAL INK JET PEN BODY CONSTRUCTION HAVING IMPROVED INK STORAGE AND FEED CAPABILITY

[75] Inventors: Jeffrey P. Baker; Duong T. La, both of San Diego; Randy A. Coverstone, Newark, all of Calif.

[73] Assignee: Hewlett-Packard Company, Palo Alto, Calif.

Reexamination Request:
No. 90/003,559, Sep. 1, 1994

Reexamination Certificate for:
Patent No.: 4,771,295
Issued: Sep. 13, 1988
Appl. No.: 880,774
Filed: Jul. 1, 1986

[51] Int. Cl.⁶ .............. B41J 2/05; B41J 2/21; B41J 2/175
[52] U.S. Cl. .................................................. 347/87
[58] Field of Search .................. 347/87, 86; 401/223

[56] References Cited

U.S. PATENT DOCUMENTS

| | | | |
|---|---|---|---|
| 2,847,975 | 8/1958 | Lawton | 401/223 |
| 3,126,874 | 3/1964 | Exner | 401/223 |
| 3,355,239 | 11/1967 | Albrecht | 401/223 |
| 3,747,120 | 7/1973 | Stemme | 347/70 |
| 3,753,756 | 8/1973 | Lox . | |
| 3,923,926 | 12/1975 | Davis et al. | 264/25 |
| 3,946,039 | 3/1976 | Walz | 264/332 |
| 3,967,286 | 6/1976 | Andersson | 347/87 |
| 4,145,967 | 3/1979 | Marozzi | 101/333 |
| 4,320,406 | 3/1982 | Heinzl | 347/43 |
| 4,329,698 | 5/1982 | Smith | 347/87 |
| 4,358,505 | 11/1982 | Narumiya | 428/332 |
| 4,359,963 | 11/1982 | Saito et al. | 118/60 |
| 4,368,478 | 1/1983 | Koto | 347/86 |
| 4,415,909 | 11/1983 | Italiano et al. | 347/68 |
| 4,465,388 | 8/1984 | Iwasawa | 400/196.1 |
| 4,630,758 | 12/1986 | Mutoh | 347/87 X |
| 4,633,274 | 12/1986 | Matsuda | 347/86 |
| 4,647,945 | 3/1987 | Andeen et al. | 347/43 |
| 4,683,481 | 7/1987 | Johnson | 347/85 X |
| 4,712,172 | 12/1987 | Kiyohara et al. | 347/87 X |
| 4,734,717 | 3/1988 | Rayfield | 347/87 |
| 4,746,935 | 5/1988 | Allen | 347/15 |
| 4,896,171 | 1/1990 | Ito | 347/86 |
| 4,914,736 | 4/1990 | Matsuda | 347/43 |

FOREIGN PATENT DOCUMENTS

| | | | |
|---|---|---|---|
| 0046985 | 10/1982 | | B41J 27/20 |
| 88292 | 9/1983 | European Pat. Off. | G01D 15/16 |
| 0139508 | 2/1985 | | B41J 3/12 |
| 2229320 | 6/1974 | France | G01D 15/16 |
| 55-142665 | 11/1980 | Japan | B41J 3/04 |
| 57-93182 | 6/1982 | Japan | B41J 27/00 |

OTHER PUBLICATIONS

Hansjurgen Saechtling, "Kunststoff Taschenbuch," 22. Ausgabe, Carl Hanser Berlag, Munchen Wien, 1983, p. 429.

Kirk–Othmer, "Encyclopedia of Chemical Technology," third edition, vol. 23, John Wiley & Sons, p. 605, second paragraph.

*Primary Examiner*—J. W. Hartary

[57] ABSTRACT

The novel pen body construction described herein includes multiple ink storage compartments communicating with a multi-orifice printhead, and these compartments are adapted to receive sections of ink-storage foam. Preferably, this foam is a reticulated polyurethane foam of controlled porosity and capalarity and is especially well suited for storing different ink colors, such as cyan, magenta and yellow. However, single compartment black ink storage is also within the scope of this invention.

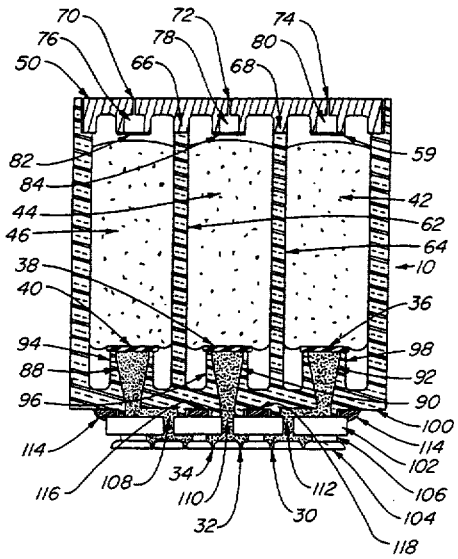

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 3, line 59—Column 4, line 2:
The nozzle plate 104 may advantageously be electroformed of nickel and plated with gold and then affixed to the polymer barrier material 106 using, for example, the heat staking process disclosed and claimed in co-pending application Ser. No. *06/*861,192 of Stephen J. Nigro et al., *filed May 8, 1986, now abandoned*. This application is entitled "Process For Manufacturing Thermal Ink Jet Printheads and Structures Produced Thereby", and is assigned to the present assignee and incorporated herein by reference. The nozzle plate 104 may be fabricated in the manner described in the above identified Hewlett Packard Journal, vol. 38, No. 5 May 1985.

AS A RESULT OF REEXAMINATION, IT HAS BEEN DETERMINED THAT:

Claims 5 and 7 are cancelled.

Claims 1, 4, 6, 8, 10 and 11 are determined to be patentable as amended.

Claims 2, 3 and 9, dependent on an amended claim, are determined to be patentable.

New claims 12-23 are added and determined to be patentable.

1. A process for feeding ink to an ink jet printhead which comprises the steps of:
   a. storing ink in a reticulated polyurethane foam of controlled capillary force, *said foam having a compressed region of increased capillarity provided by an ink pipe and mesh filter that are in compressive contact with said foam,*
   b. bringing said foam into ink flow communication with said printhead, and
   c. passing ink from said foam *through said compressed region of increased capillarity, through said filter and ink pipe,* and through ink ejection orifices in said printhead, whereby ink is communicated from said foam to said printhead with [a] *said* controlled capillary force.

4. An ink jet pen including, in combination,
   a. a housing and support member having a support surface at one end thereof with openings for passing ink therethrough,
   b. an ink jet printhead mounted on said support surface and having a plurality of ink ejection orifices communicating with said openings in said support surface, and
   c. a reticulated polyurethane foam material mounted within said housing and said support member and operative to receive and retain a supply of ink for feeding said ink through said openings in said support surface and to said inkjet printhead, with said printhead receiving ink directly from said openings in said support surface and operative to eject ink in a direction normal to said support surface,
   d. *wherein said housing has three separate compartments therein for receiving three bodies of foam which function respectively to store cyan, magenta and yellow ink therein, and wherein each compartment includes an ink pipe for feeding ink from said foam to said printhead, each said ink pipe being located between vertical walls defining each compartment and spaced therefrom to provide a spacing beneath said foam between said walls, so as to increase the compressive forces on said foam in the region of said foam above each said ink pipe, whereby capillarity in said foam region is increased and the possibility of air interrupting the ink path vertically through said foam and into said ink pipe is reduced.*

6. An ink jet pen including in combination:
   a. *a* housing [means] including a support surface at one end thereof *and interior walls mounted to said support surface,* with openings *in said support surface* for passing ink, *said housing having a plurality of compartments,*
   b. an ink jet printhead mounted on one side of said support surface and having a plurality of ink ejection orifices for receiving ink from said openings and operative for ejecting ink of selected colors from the plane of said orifices onto a print medium, and
   c. [means within said housing for storing ink of various colors and black and for feeding] *reticulated polyurethane foam mounted in said compartments and operative to receive and retain ink of various colors and black and to feed* said ink directly through and normal to both said support surface of said housing [means] and an adjacent parallel surface of said ink jet printhead and through said ink ejection orifices in a direction normal to said support and printhead surfaces[, said storing means includes compartments therein each containing a reticulated polyurethane foam for receiving said ink]*, and*
   d. *a plurality of ink pipes, one in each of said compartments, mounted to said support surface and fluidically coupled to said openings, said ink pipes being spaced from said interior walls and extending into compressive contact with said foam to provide a spacing beneath said foam between said interior walls to thereby increase the capillarity of said foam in each said compartment in the region of said ink pipes.*

8. [Ink] *An ink* storage and ejection [means] *chamber* for an ink jet pen *comprising a housing,* a foam material [means for storing] *mounted in said housing and operative to store* ink of selected colors and black or clear vehicle located within [a] *said* housing, [and] an ink jet printhead mounted on an external surface of said housing for receiving ink from said foam material [means] and through openings in said housing, said foam material [means] being a controlled porosity ether type foam which has been reticulated to break the membrane walls therein, thereby increasing the capillary force of the foam and also increasing the mobility of ink flow therein, *wherein each said opening is fluidically coupled to an ink pipe that is mounted within said housing, and wherein a filter is provided on each ink pipe, said ink pipes and filters extending into compressive contact with said foam material to increase the capillarity of said foam material in the region of said ink pipes and filters.*

10. A printhead and orifice plate assembly which comprises:
   a. a substrate member having a plurality of openings therein for receiving different colors of ink,
   b. a barrier layer mounted on said substrate and having a geometry defining a plurality of ink reservoirs which receive ink from said openings,
   c. a nozzle plate disposed on said barrier layer and having a plurality of ink ejection orifices which receive different colors of ink from said reservoirs, whereby multiple colors of ink may be ejected from a single plane in which said orifices lie,
   d. a multi-compartment housing adjacent to and supporting said substrate member, [and] *each said compartment having interior walls,*
   e. [ink storage means within each compartment of said housing for supplying] *reticulated polyurethane foam mounted within each said compartment and positioned to supply* ink to said substrate member and directly through openings in said housing, [said ink storage means being a reticulated polyurethane foam]
   f. *an ink pipe mounted within each said compartment and spaced from said interior walls,*
   g. *a mesh filter provided on each said ink pipe, and*
   h. *ink provided in said foam in each said compartment,*
   i. *said ink pipes and filters extending into compressive contact with said foam to provide a spacing beneath said foam between said interior walls to thereby increase the capillarity in said foam in the region above each said ink pipe and filter.*

11. An ink jet pen including, in combination:
   a. a housing and support member having a support surface at one end thereof [for passing ink] *with an opening in said support surface to pass ink,*
   b. an ink jet printhead mounted on said support surface and having a plurality of ink ejection orifices communicating with [openings] *said opening* in said support surface,
   c. a porous ink storage material mounted within said housing and said support member [and operative to receive and retain a supply of ink for feeding] *that receives and retains a supply of ink under a controlled capillary force and feeds* said ink through said opening in said support surface and to said ink jet printhead, [and]
   d. an ink pipe *mounted to said support member and* extending between said ink jet printhead and said porous ink storage material, *said ink pipe* extending into compressive contact with said ink storage material so as to *provide a spacing beneath said foam between said interior walls to* increase the compressive forces thereon and thereby increase the capillarity in said ink storage material *in the region of said ink pipe, and*
   e. ink provided in said foam.

12. A process for feeding ink to an ink jet printhead which comprises the steps of:
   a. providing a housing with a reticulated polyurethane foam of a controlled capillary force and an ink pipe with a filter provided thereon, said ink pipe and filter extending from said housing into compressive contact with said foam to provide a spacing between said foam and said housing to thereby increase the capillarity of said foam in the region of said ink pipe and filter,
   b. storing ink in said foam,
   c. bringing said foam into ink flow communication with said printhead, and
   d. passing ink from said foam through said region of increased capillarity, through said filter and ink pipe, and through ink ejection orifices in said printhead, whereby ink is communicated from said foam to said printhead with said controlled capillary force.

13. A process according to claim 12, which includes:
   a. providing said foam in three separate sections in said housing, and
   b. providing each of these sections with a different color of ink.

14. A process according to claim 12, which includes inserting said foam into a single compartment pen body and filling said foam with black ink.

15. A process according to claim 12, which includes providing said printhead as a thermal ink-jet printhead.

16. An ink jet pen including, in combination:
   a. a housing having interior walls and support member having a support surface at one end thereof with an opening in said support surface to pass ink,
   b. an ink jet printhead mounted on said support surface and having a plurality of ink ejection orifices communicating with said opening in said support surface,
   c. a porous ink storage material mounted within said housing and said support member and that receives and retains a supply of ink under a controlled capillary force and feeds said ink through said opening in said support surface and to said ink jet printhead,
   d. an ink pipe mounted to said support member and having a mesh filter provided thereon and extending between said ink jet printhead and said porous ink storage material, said ink pipe and filter extending into compressive contact with said ink storage material so as to increase the compressive forces thereon and thereby increase the capillarity in said ink storage material in the region of said ink pipe and filter, and
   e. ink provided in said ink storage material.

17. An ink jet pen according to claim 16 wherein said filter is a wire mesh positioned on the opening of said ink pipe that contacts said foam.

18. An ink jet pen according to claim 16 wherein said filter is stainless steel wire mesh.

19. An ink jet pen according to claim 11 or 16 wherein said printhead is a thermal ink jet printhead.

20. An ink jet pen according to claim 11 or 16 further comprising internal ink channels leading from said ink pipe to said printhead, wherein the internal width of said ink pipe at the point of contact with said foam is larger than said internal ink channels.

21. An ink jet pen according to claim 11 or 16 wherein said foam curves and conforms around said ink pipe at the position of contact with said foam.

22. A thermal ink jet pen including, in combination:
   a. a housing having interior walls and support member having a support surface at one end thereof with an opening in said support surface to pass ink,
   b. a thermal ink jet printhead mounted on said support surface and having a plurality of ink ejection orifices communicating with said opening in said support surface, c. a porous ink storage foam mounted within said housing and said support member and that receives and retains a supply of ink under a controlled capillary force and feeds said ink through said opening in said support surface and to said ink jet printhead, d. an ink pipe mounted to said support member and having a mesh filter provided thereon and extending between said ink jet printhead and said foam, said ink pipe and filter extending into compressive contact with said foam so as to provide a spacing beneath said foam between said interior walls to increase the compressive forces thereon and thereby increase the capillarity in said foam in the region of said ink pipe and filter, and e. ink provided in said foam.

23. A thermal ink jet pen according to claim 22, wherein said mesh filter is a wire mesh filter.

* * * * *